United States Patent [19]
Anderson et al.

[11] Patent Number: 5,800,922
[45] Date of Patent: Sep. 1, 1998

[54] METHOD OF MAKING A GELATION-RESISTANT ALUMINA

[75] Inventors: Edward M. Anderson, Roland, Ark.; Neal R. Dando, Murrysville, Pa.; Carl H. Lawhon; Merle D. McRaven, both of Benton, Ark.

[73] Assignee: Aluminum Company of America, Pittsburgh, Pa.

[21] Appl. No.: 688,702

[22] Filed: Jul. 30, 1996

Related U.S. Application Data

[62] Division of Ser. No. 453,551, May 30, 1995, Pat. No. 5,681,658.

[51] Int. Cl.⁶ ................................................. B32B 5/16
[52] U.S. Cl. ................ 428/403; 423/625; 423/626; 427/215; 427/242; 427/399
[58] Field of Search ........................ 427/215, 242, 427/399; 241/15, 16, 18; 264/117; 428/403; 423/625, 626

[56] References Cited

U.S. PATENT DOCUMENTS

| | | | |
|---|---|---|---|
| H189 | 1/1987 | Bauer | 423/111 |
| 3,954,659 | 5/1976 | O'Brien | 252/313 R |
| 4,019,914 | 4/1977 | Esper et al. | 106/62 |
| 4,055,509 | 10/1977 | Weimer | 252/363.5 |
| 4,117,105 | 9/1978 | Hertzenberg et al. | 423/625 |
| 4,211,667 | 7/1980 | Yamada et al. | 252/313 R |
| 4,242,223 | 12/1980 | Christner et al. | 252/313 R |
| 4,344,928 | 8/1982 | Dupin et al. | 423/626 |
| 4,360,449 | 11/1982 | Oberlander et al. | 252/313 R |
| 4,657,754 | 4/1987 | Bauer et al. | 423/625 |
| 4,676,928 | 6/1987 | Leach et al. | 252/313.1 |
| 4,729,890 | 3/1988 | Stacey et al. | 423/628 |
| 4,913,840 | 4/1990 | Evans et al. | 252/313.2 |
| 5,178,849 | 1/1993 | Bauer | 423/626 |
| 5,261,930 | 11/1993 | Fliedner et al. | 51/293 |
| 5,284,809 | 2/1994 | Van Dijen | 501/127 |

FOREIGN PATENT DOCUMENTS

0152768  6/1993  European Pat. Off. .

*Primary Examiner*—Peter Chin
*Assistant Examiner*—Sean Vincent
*Attorney, Agent, or Firm*—Douglas G. Glantz; David W. Pearce-Smith

[57] ABSTRACT

A novel gelation-resistant alumina and process for producing such a product and aqueous slurries composed thereof are disclosed, including grinding aluminum oxide of $\alpha$-$Al_2O_3$ in the presence of about 0.5 to 3.0 wt. % water. The grinding preferably is performed in a sealed ball mill. Dual phase alumina particles have an aluminum oxide inner core of $\alpha$-$Al_2O_3$ and an aluminum oxide hydroxide outer phase of $\gamma$-AlOOH on the $\alpha$-$Al_2O_3$, including to a nominal depth, e.g., by way of example, of about 5 to 100 nanometers on the inner core of $\alpha$-$Al_2O_3$, and having up to 40% higher surface area than the initial aluminum oxide of $\alpha$-$Al_2O_3$. The novel gelation-resistant alumina can be dispersed in an aqueous slurry having a solids content of 65 wt. % and higher, and the resulting slurry has significantly extended shelf life.

19 Claims, 5 Drawing Sheets

FIG. 1

DRIFTS SPECTRUM FOR RUN 196
BOEHMITE/ALPHA ALUMINA COMPOSITE

FIG. 2

DRIFTS SPECTRUM FOR RUN 195

FIG. 3

ALPHA ALUMINA - DRIFTS SPECTRUM

FIG. 4

BAYERITE Al(OH)₃ - DRIFTS SPECTRUM

FIG. 5

BOEHMITE γ-AlOOH - DRIFTS SPECTRUM

FIG. 6

DRIFTS SPECTRUM FOR RUN 235

FIG. 7

DRIFTS SPECTRUM FOR RUN 236

FIG. 8

DRIFTS SPECTRUM FOR RUN 251

FIG. 9

DRIFTS SPECTRUM FOR RUN 252

FIG 10

METHOD OF MAKING A GELATION-RESISTANT ALUMINA

This patent application is a division of prior, U.S. patent application Ser. No. 453,551, filed May 30, 1995, now U.S. Pat. No. 5,681,658.

BACKGROUND OF THE INVENTION

The present invention relates to ground, thermally reactive alumina and aqueous slurries composed thereof.

Aluminum oxide of the accepted crystallographic designation $\alpha$-$Al_2O_3$ and of the mineral name corundum is the only thermodynamically stable oxide of aluminum. The natural occurrence of corundum is commonly associated with igneous and metamorphic rocks. It is the chief component of the abrasive mineral emery. Red and blue gem quality corundum crystals are known as ruby and sapphire, respectively. The red color of ruby is derived from the presence of chromium, and the blue of sapphire is related to the presence of iron and titanium.

Aluminum oxide of $\alpha$-$Al_2O_3$ can be synthesized by thermal and hydrothermal methods. Aluminum oxide ($\alpha$-$Al_2O_3$) is formed by thermal dehydration of aluminum hydroxides. The extent of conversion to the aluminum oxide ($\alpha$-$Al_2O_3$) structure depends on the temperature and time of thermal treatment. Total conversion occurs on heating above 1500° K. for more than one hour. Technical grades of "calcined," "reactive," or "thermally reactive" aluminas, used for aluminum smelting, ceramics, or abrasives represent materials with different degrees of conversion to aluminum oxide ($\alpha$-$Al_2O_3$) varying from 5 to 100%. The temperature and rate of conversion are affected by impurities and "mineralizers." The sizes of aluminum oxide ($\alpha$-$Al_2O_3$) crystals formed are dependent on complex functions of precursor hydroxide, temperature, time, and calcination environment. The presence of fluoride and boron ions are known to facilitate the growth of aluminum oxide ($\alpha$-$Al_2O_3$) crystals.

Ground, thermally reactive alumina and aqueous slurries composed of such thermally reactive alumina are used to make alumina ceramics commercially for structural, electronic, thermal, optical, biomedical, and other important applications. The ground, thermally reactive aluminas are extruded, pressed, slip cast, and roll compacted to make these alumina ceramics.

Aqueous slurries composed of the ground, thermally reactive aluminas are most often used to make these ceramics in the several applications. By thermally reactive is meant a powder that will sinter to near theoretical density when fabricated into a shape and fired to a temperature below to well below the fusion temperature of alumina. The temperature below the fusion temperature will vary in direct relation to the fineness of the alumina. As fineness increases, sintering temperature decreases. The finely ground, dense, high surface area aluminas are preferred for many applications including, for example, structural ceramics and electronic packaging and substrate manufacturing.

INTRODUCTION TO THE INVENTION

Thermally reactive aluminas, e.g., as available commercially from the Aluminum Company of America, are designed for high alumina advanced ceramic applications where high density and fine, uniform microstructures are required at lower firing temperatures. Outstanding reactivities of the commercially available fine powders qualify them as ideal components for alumina composite materials and show good performance in many engineering ceramic parts which require good mechanical properties as well as chemical resistance. Low shrinkage characteristics maintain closer tolerances on fired dimensions, avoiding deformation and cracking, particularly in larger shapes. Fine particle size distributions and low firing temperatures reduce grain growth during sintering and ensure fine microstructures with enhanced mechanical strength, toughness, and wear resistance. The high purity and controlled fine primary grain sizes lead to excellent electrical and mechanical properties and a smooth surface finish critical to thin film substrates and other ceramic applications.

Certain ground, unmineralized and mineralized, "thermally reactive" aluminas manufactured for and used by the ceramic industry, e.g., such as Alcoa A-12, A-17, A-15, A-16SG, A-152SG, CT-1200SG, and A-2750 alumina product designations, occasionally have been observed to gel suddenly. The gelling has occurred primarily during the preparation or use of high solids content (65 wt. % and higher) slips for slip casting, pressure casting, spray drying, and other ceramic manufacturing processes where aqueous slurries are used. The gelling typically occurs in 8 to 72 hours, usually is irreversible, and can be so intense that a pump cannot pump it, a mill cannot mill it, and a caster cannot pour or cast it. In the most severe cases, the gelling sets up so hard that a pick is needed to remove it from a mill, tank, or pump. The gelling results are usually dramatic and unacceptable to the ceramic manufacturer, including loss of material, production, and sometimes equipment.

Accordingly, a novel gelation resistant alpha alumina product and process for making such a novel gelation-resistant alumina product are needed for providing ground, unmineralized and mineralized, "thermally reactive" aluminas which are dispersible in gelation resistant slurries having an extended shelf life.

Leach et al., U.S. Pat. No. 4,676,928, disclose a method for producing a water-dispersible alumina. The Leach et al. patent covers treating uncalcined aluminas (claim 1). The method first forms a slurry (dispersing the alumina in water), then treats with an acid to reduce pH from 9 to 5, and ages at a temperature of 70° to 100° C. to form a colloidal sol. Leach et al. include (claim 2) colloidal sols having alumina contents of 9–15% by weight.

Evans et al., U.S. Pat. No. 4,913,840, disclose a method for producing an alkaline sol containing colloidal aluminum oxide hydroxide, by adding sodium hydroxide. The method includes calcining aluminum trihydroxide at a temperature from about 300° to about 750° C., preferably 400° C., (col. 3, lines 3–5) to form an aluminum oxide hydroxide, and then milling the aluminum oxide hydroxide with a dispersion liquid to form a colloidal sol of aluminum oxide hydroxide having high surface area and fine particle sizes (e.g., 100 nanometer, Example 1). The Evans et al. sol must be kept at alkaline pH, or it will destabilize.

Oberlander et al., U.S. Pat. No. 4,360,449, disclose heating alumina, e.g., alumina derived from the hydrolysis of aluminum alkoxide, in a sealed autoclave to a temperature of 250° to 700° F. at elevated pressures (10–2000 psig) in 10–80 wt. % water. Oberlander et al. disclose mixing the treated alumina with a peptizing acid and that the method provides dispersions which will remain fluid up to days longer than those prepared from the untreated alumina.

Hertzenberger et al., U.S. Pat. No. 4,117,105, disclose a process for preparing boehmite (aluminum oxide hydroxide) from aluminum trihydroxide. The aluminum trihydroxide is calcined to increase surface area (200° to 850° C., 200° to 450° C., preferred) and then made into a slurry in water and heated in an autoclave at a temperature of 140° to 200° C. to achieve crystallization and rehydration. The material then is dried using conventional methods. The dewatered particles are dispersed in water containing small amounts of acid.

Weimer, U.S. Pat. No. 4,055,509, discloses a method for increasing the water dispersibility of diaspore, aluminum oxide hydroxide (α-AlOOH). The method includes producing alumina sols characterized by neutralizing a water-soluble basic aluminum salt with an alkali to produce alumina gels, and subjecting the alumina gels to a hydrothermal treatment in the presence of a monovalent organic acid.

O'Brien, U.S. Pat. No. 3,954,659, discloses a method for forming stable aqueous dispersions of alumina by dispersing alumina dried with a strongly acidic solution. An aqueous hydrochloric acid solution is prepared at a pH of from 1.0 to 3.0. Colloidal aluminum monohydrate is added to the aqueous solution with vigorous mixing, forming a concentration of about 10 to 30% and a dispersion with a pH of about 1.0 to 3.5. The dispersion is dried at a temperature from about 50° to 200° C. at 0.1 to 1 atmospheres. The dried dispersion is crushed and redispersed in water to form a dispersion of 25% to 30% $Al_2O_3$.

Technical efforts have been made to overcome the gelling in aluminum oxide by means and methods of acidifying to an acid pH and then to restore alkaline pH, or otherwise to overcome the gelling in aluminum oxide by heating, e.g., to temperatures above about 150° F., or by storing for extended periods (2 to 3 years) at atmospheric conditions. These methods have been found to reduce or eliminate the gelation tendency of the thermally reactive, alpha aluminas, but they are not considered to be practical, or they put an added burden of processing on the user, and thereby have been found to be ineffective or inefficient.

It is an object of the present invention to provide process and product for providing a gelation-resistant alumina.

It is an object of the present invention to provide process and product for providing a gelation resistant aluminum oxide $α-Al_2O_3$ alumina material.

It is an object of the present invention to provide process and product for providing a gelation resistant aluminum oxide ($α-Al_2O_3$) material having an extended shelf life when used in an aqueous slurry.

Another object of the present invention is to provide process and product for providing a gelation resistant aluminum oxide ($α-Al_2O_3$) material having an extended shelf life when used in an aqueous slurry for electronic packaging and substrate manufacturing operations.

Yet another object of the present invention is to provide an aqueous slurry having high solids content of a gelation resistant aluminum oxide ($α-Al_2O_3$) material having an extended shelf life.

These and other objects of the present invention will become apparent from the detailed description which follows.

SUMMARY OF THE INVENTION

The present invention provides a novel gelation-resistant alumina product and process for producing such a gelation-resistant alumina product and an aqueous slurry composed thereof, including providing an aluminum oxide of $α-Al_2O_3$ and grinding the aluminum oxide of $α-Al_2O_3$ in the presence of about 0.5 to 3.0 wt. % water to form a gelation-resistant alumina. The aluminum oxide of $α-Al_2O_3$ includes thermally reactive aluminas formed when aluminum trihydroxide is calcined at a temperature of at least about 1000° C. The grinding preferably is performed in a sealed ball mill, which when used in accordance with the process of the present invention provides a systematically elevated temperature.

The novel gelation-resistant alumina product produced from ground, thermally reactive alpha alumina provides a composition of dual phase alumina particles having an aluminum oxide inner core of $α-Al_2O_3$ and an aluminum oxide hydroxide outer phase of γ-AlOOH on the aluminum oxide inner core of $α-Al_2O_3$. The composition of dual phase alumina particles can be formed to provide the aluminum oxide hydroxide outer phase of γ-AlOOH to a nominal depth of, e.g., by way of example, about 5 to 100 nanometers on the aluminum oxide of $α-Al_2O_3$ and up to 40% higher surface area than the initial aluminum oxide of $α-Al_2O_3$.

The gelation-resistant alumina can be dispersed in an aqueous slurry having a solids content of at least about 50 wt. %, preferably at least about 65 wt. % and higher, and the resulting slurry is capable of resisting gelling over an extended shelf life.

DETAILED DESCRIPTION

In accordance with the present invention, a novel method of grinding calcined aluminum oxide ($α-Al_2O_3$) provides a novel gelation resistant product of the present invention and novel compositions of aqueous slurries thereof. In the novel method, the calcined aluminum oxide is ground in the presence of a small amount of water, e.g., in one embodiment 0.5–3.0 wt. %, preferably between about 0.5–1.0 wt. %, to obtain a product more resistant to gelation when dispersed in an aqueous slurry and which has an extended shelf life.

A boehmite (γ-AlOOH) phase has been found to be produced and contained in the novel method of the present invention on the outer surface of the aluminum oxide particles, the phase extending into the particles, e.g., by way of example, to a depth of about five to one hundred nanometers.

It has been found that the in situ hydration of the $α-Al_2O_3$ surface during grinding has produced a reactive alpha alumina powder with a reproducible surface that does not gel in aqueous slips. The reactive alumina powder with a reproducible surface that does not gel in aqueous slips has been found to have a long shelf life and produces stable slips that can be stored for indefinite periods, e.g., for periods of six (6) months and longer. The advantages of the reactive alumina powder of the present invention have been found substantially to prevent gelation and to provide a product with a consistent rheology. The absence of gelling and the increased consistency of the powder also improves the properties of the final ceramic produced from the novel reactive alumina powder.

Figure 1:
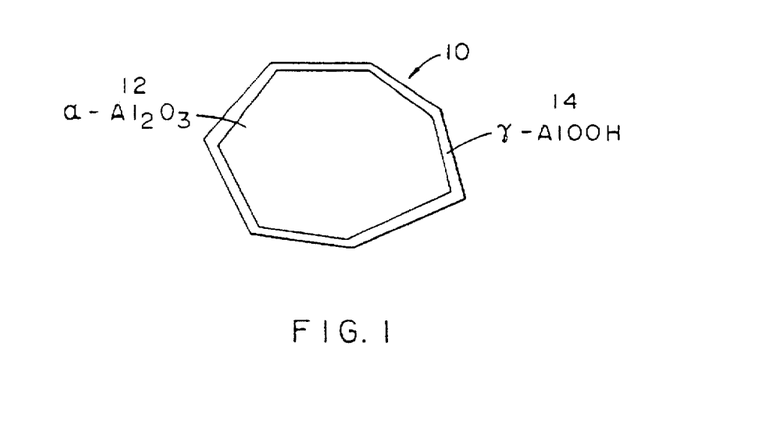
FIG. 1 depicts a simplified schematic cross section of the dual phase particle of the present invention.

Referring now to FIG. 1, a schematic cross section is depicted of the dual phase particle 10 of the present invention. Inner core 12 has a diameter or thickness dimension in the range of typically about 0.1 microns to 5 microns, in one aspect about 0.5 microns to 5 microns, and more particularly about 1 micron to 3 microns depending on the application. Outer boehmite coating layer 14 is formed on inner core 12 at a nominal depth, e.g., by way of example, at a depth or thickness of 5 to 100 nanometers. As can be observed from an inspection of FIG. 1, layer dimensions are not to scale.

The present invention provides a novel gelation-resistant alumina product and process for producing such a gelation-resistant alumina product and an aqueous slurry composed thereof. The present invention includes providing an aluminum oxide of $\alpha\text{-}Al_2O_3$ and grinding the aluminum oxide of $\alpha\text{-}Al_2O_3$ in the presence of about 0.5 to 3.0 wt. % water (0.5–3.0 wt. %), preferably about 0.5 to 1.0 wt. % water (0.5–1.0 wt. %), and more preferably in one aspect about 0.65 to 0.85 wt. % water (0.65 to 0.85 wt. %), to form a gelation-resistant alumina. The aluminum oxide of $\alpha\text{-}Al_2O_3$ includes aluminum trihydroxide calcined at a temperature of at least about 1000° C., preferably about 1075° C. to about 1250° C.

The present invention provides an aluminum oxide of $\alpha\text{-}Al_2O_3$ and grinds the aluminum oxide of $\alpha\text{-}Al_2O_3$ in the presence of about 0.5 to 3.0 wt. % water (0.5–3.0 wt. %), preferably about 0.5 to 1.0 wt. % water (0.5–1.0 wt. %), to form a gelation-resistant alumina. It has been found empirically in the discovery and development of the present invention that less than about 0.5 wt. % water produces a coating which may not provide the uniformity found in the coating of the present invention. It has been found empirically in the discovery and development of the present invention that less than about 0.5 wt. % water produces uncoated regions or a coating so thin that it does not slow down the surface reactivity with water or provide the adequate gelation resistance provided by the process and composite particle of the present invention.

In accordance with the present invention, the grinding operation in one aspect preferably is performed in a sealed ball mill, which has been found to provide a suitable elevated temperature, systematically when operated in the presence of about 0.5 to 3.0 wt. % water (0.5–3.0 wt. %), preferably, e.g., by way of example, in the range of about 150° to 200° C., to provide a suitable elevated temperature in a sealed, commercially standard ball mill with a more particular range of about 0.5 to 1.0 wt. % water (0.5–1.0 wt. %). The present invention including grinding performed in a sealed ball mill has been found empirically to set up elevated temperatures and pressures which set the upper limit of the range of operation when operated in the presence of about 0.5 to 3.0 wt. % water. If the ball mill is left unsealed, the grinding operation performed in an unsealed ball mill has been found to provide unsuitable temperatures and moisture content.

The grinding operation in one aspect preferably is performed in a sealed ball mill operating at a moisture content and temperature between about 60° to 220° C., preferably about 80° to 220° C. This temperature range and sealed condition has been found to provide the suitable process for vaporizing the 0.5 to 3.0 wt. % water added and to produce the hydration of the alpha alumina surface with the formation of the $\gamma\text{-}AlOOH$ outer layer. Below these temperatures, the hydration of the surface is reduced dramatically. No hydration occurs at room temperature and atmospheric pressure.

It has been found that the gelation-resistant alumina product of the present invention produced from ground, thermally reactive alumina provides a composition of dual phase alumina particles having an aluminum oxide inner core of $\alpha\text{-}Al_2O_3$ and an aluminum oxide hydroxide outer phase of $\gamma\text{-}AlOOH$ adhering to the aluminum oxide inner core of $\alpha\text{-}Al_2O_3$. The composition of dual phase alumina particles can be formed to provide the aluminum oxide hydroxide outer phase of $\gamma\text{-}AlOOH$ to a nominal depth of, e.g., by way of example, about 5 to 100 nanometers on the aluminum oxide of $\alpha\text{-}Al_2O_3$ and further to provide up to 40% higher surface area than the initial aluminum oxide of $\alpha\text{-}Al_2O_3$.

The gelation-resistant alumina can be dispersed in an aqueous slurry having a solids content of at least about 50 wt. %, preferably at least about 65 wt. %, more preferably at least about 65 to 80 or more wt. %, and the resulting slurry is capable of resisting gelling over an extended shelf life. Aluminas derived from this process provide significant advantages over existing commercially available products.

In accordance with the present invention, a novel process thereby has been developed which allows for the in situ development of a thin boehmite "shell" on the surface of calcined aluminas. The chemical composition nomenclature for boehmite is aluminum oxide hydroxide (Boehmite, $\gamma\text{-}AlOOH$). Aluminum oxide hydroxide of boehmite can be synthetically produced when precipitated by neutralizing aluminum salts or aluminate solutions at temperatures near and above the boiling point of water. Treating amalgamated (activated) aluminum with boiling water is another method of preparation. Aluminum covered with an oxide film reacts very slowly under these conditions. The reaction product formed on the surface consists of X-ray indifferent material and gelatinous boehmite, i.e., a poorly crystallized, hydrated form. In the autoclave, crystalline boehmite grows at a measurable rate. Formation of boehmite by a solid state reaction is observed when gibbsite is heated in air to temperatures between 380° and 575° K. Conversion of the trihydroxide to measurable amounts of AlOOH requires rapid heating and coarse particles. Locally high water vapor pressures generated within large gibbsite grains during rapid dehydration lead to the formation of the aluminum oxide. $Al(OH)_3$ heated above 375° K. under water or dilute alkaline solutions is quantitatively converted to boehmite.

The structure of boehmite consists of double layers in which the oxygen ions are in cubic packing. These layers are composed of chains formed by double molecules of AlOOH which extend in the direction of the a-axis. Hydroxyl ions of one double layer are located over the depression between OH ions in the adjacent layers. The double layers are linked by hydrogen bonds between hydroxyl ions in neighboring planes. Average O—O distance of the hydrogen bridges is 0.27 nm.

Research analytical methodologies encompassing solid state cross-polarization Al-27 NMR. (nuclear magnetic resonance) and FTIR (Fourier transform infrared reflectance) of HATR (horizontal attenuated total reflectance) and DRIFT (diffuse reflectance infrared Fourier transform) spectroscopies developed by the Aluminum Company of America for identifying the causative mechanism of gelation in reactive calcined aluminas were applied to aluminas produced by the modified grinding process of the present invention which empirically had been found to exhibit dramatic gelation resistance.

The gelation resistance was proven by preparing two ground aluminas from the same parent lot of calcined alumina. The grinds were prepared by two processes: (1) dry grinding, and (2) controlled water addition grinding in accordance with the present invention. These lots are labeled in Table I, presented hereinbelow in the Example, as Run 195 and Run 196, respectively. The gelation behavior of these lots is readily determined from the viscosities presented in Table I. The dry grind product gelled in 24 hours. The modified grind alumina was more viscous than the dry ground product but did not gel during the entire test duration (3 days). The modified grind alumina was more viscous than the dry ground product because the higher surface area absorbs more of the water, thereby providing less water available to provide flow characteristics in the slurry. A dispersant such as polyelectrolyte dispersant or other suitable dispersant can improve this viscous nature. The modified grind alumina did not gel during the entire test duration (3 days)

Figure 2:
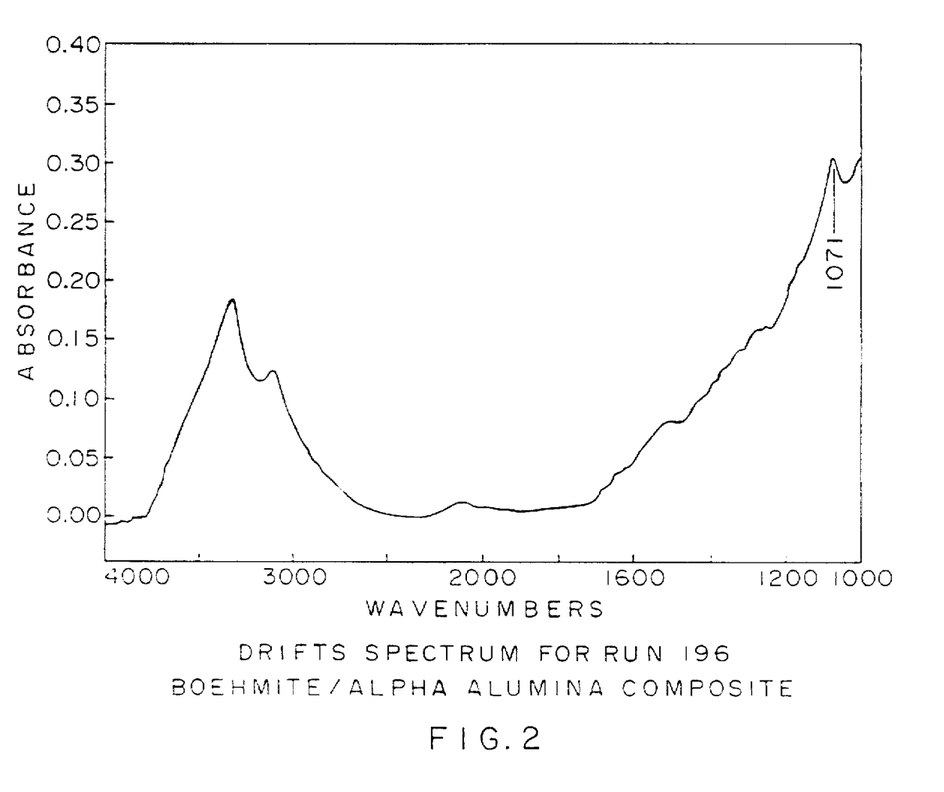
FIG. 2 presents a graphical depiction comparing Fourier Transform Infrared Analysis of the dual phase particle of the present invention.

Referring now to FIGS. 2–10. FIG. 2 presents a graphical depiction compares Fourier Transform Infrared Analysis of the dual phase particle of the present invention.

Figure 3:
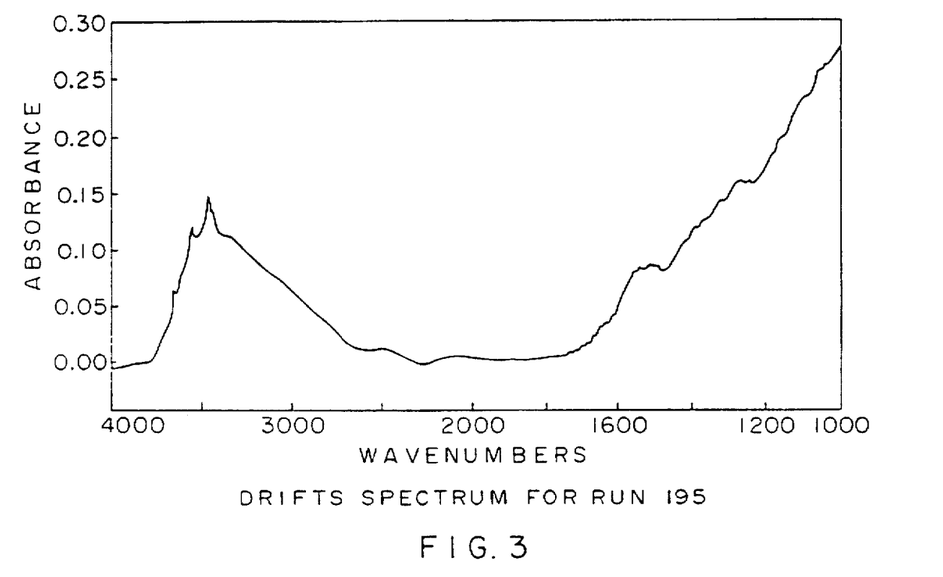
FIG. 3 presents a graphical depiction comparing Fourier Transform Infrared Analysis of a modified grind alumina.

The diffuse reflectance infrared Fourier transform (DRIFT) spectrum of the dry grind alumina (Run 195) is shown in FIG. 3. This spectrum is indicative of alpha alumina. A broad O-H stretching region is evidence of highly shared hydroxyls as would exist on a metal oxide surface that is hydroxyl deficient.

Figure 4:
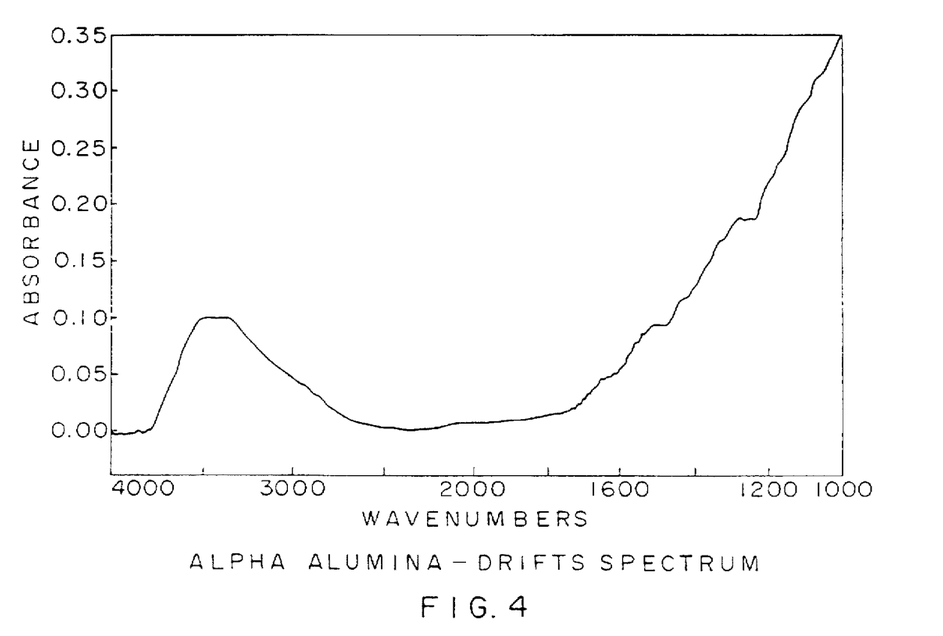
FIG. 4 presents a graphical depiction comparing Fourier Transform Infrared Analysis of alpha alumina.
Figure 5:
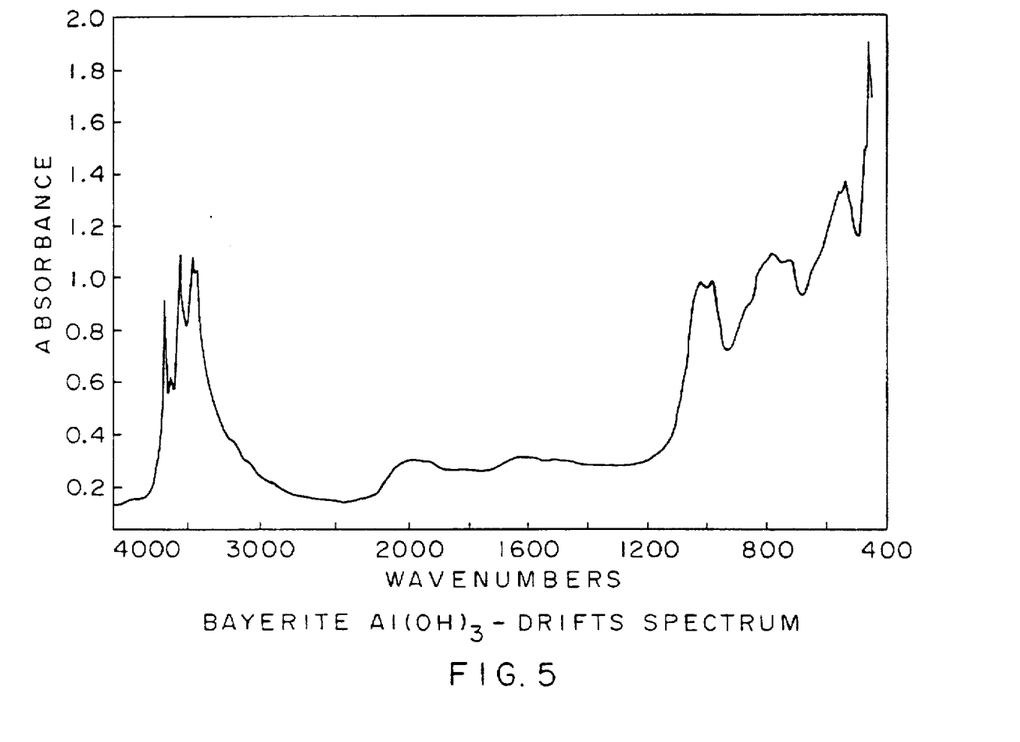
FIG. 5 presents a graphical depiction comparing Fourier Transform Infrared Analysis of bayerite.

FIG. 4 shows a DRIFT spectrum of alpha alumina. FIG. 5 shows a DRIFT spectrum of bayerite.

In about one year of ambient conditions aging, small, sharp peaks on top of the broad O-H stretch arise from small amounts of bayerite on the surface, because of the reaction of the dry ground alumina surface with atmospheric moisture. The new material provides the effect of aging on product performance.

Figure 6:
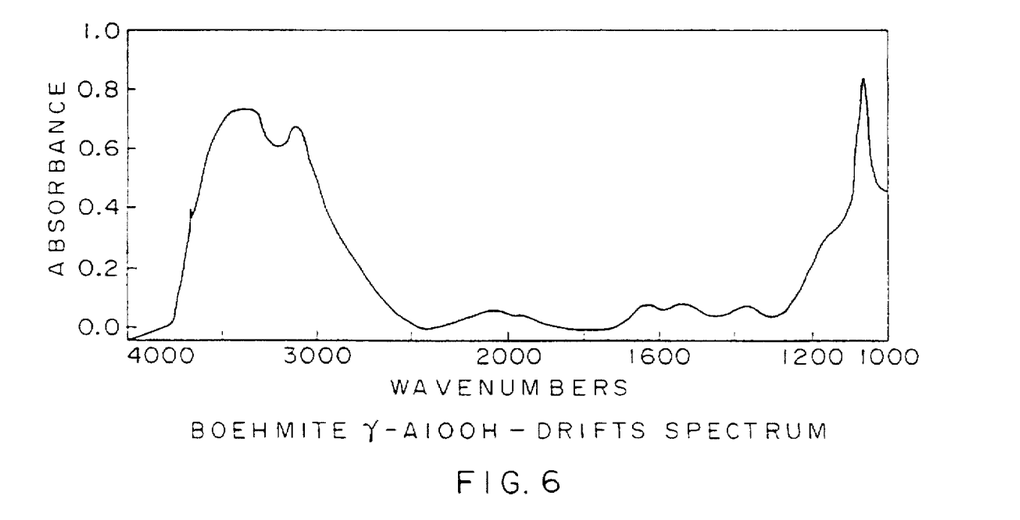
FIG. 6 presents a graphical depiction comparing Fourier Transform Infrared Analysis of boehmite.
Figure 7:
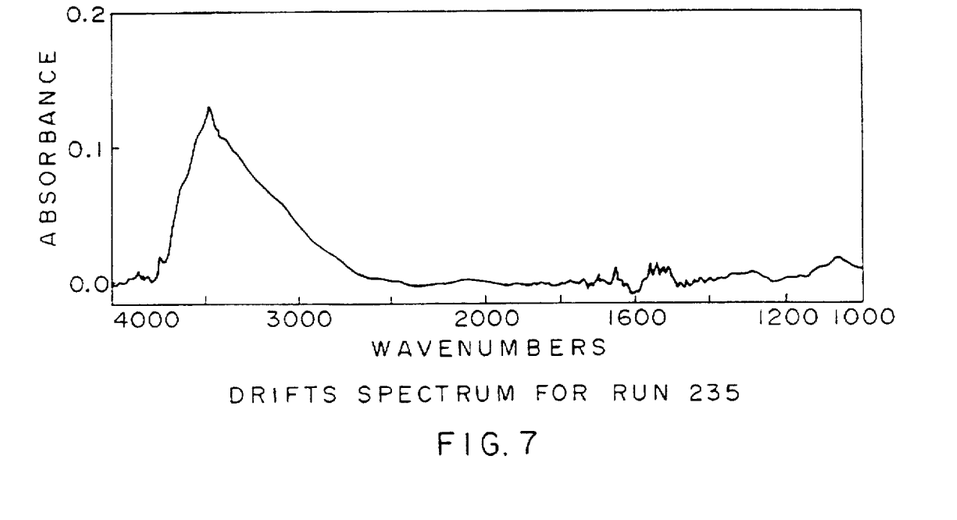
FIGS. 7–10 show graphical depictions comparing Fourier Transform Infrared Analysis of various modified grind aluminas.
Figure 8:
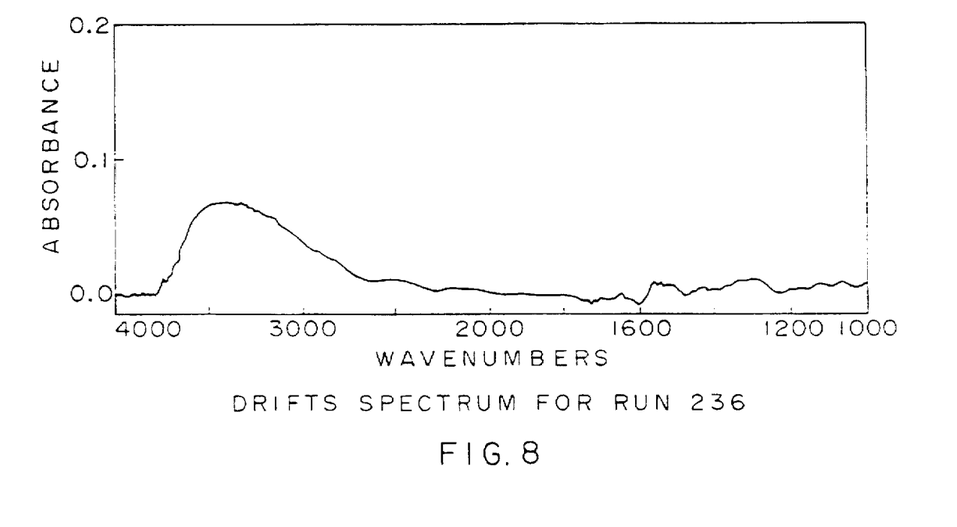
Figure 9:
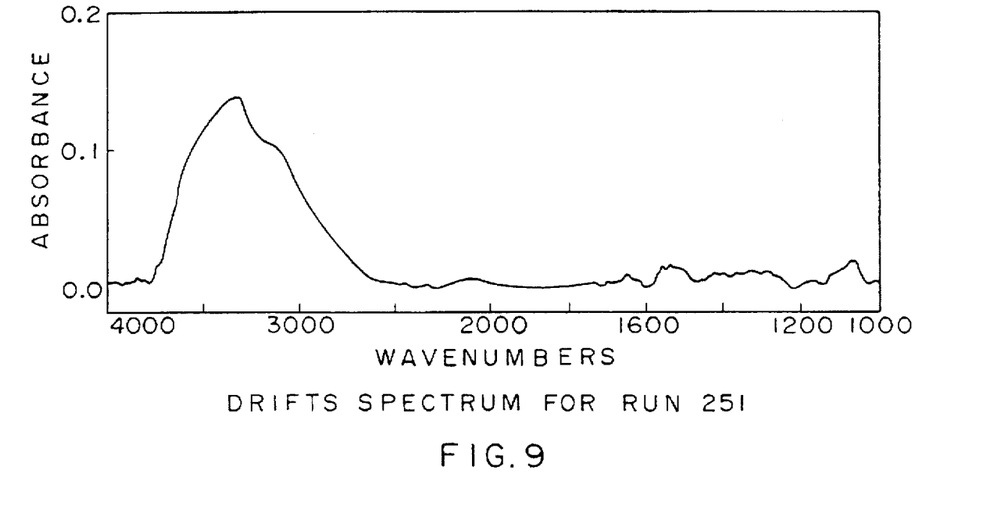
Figure 10:
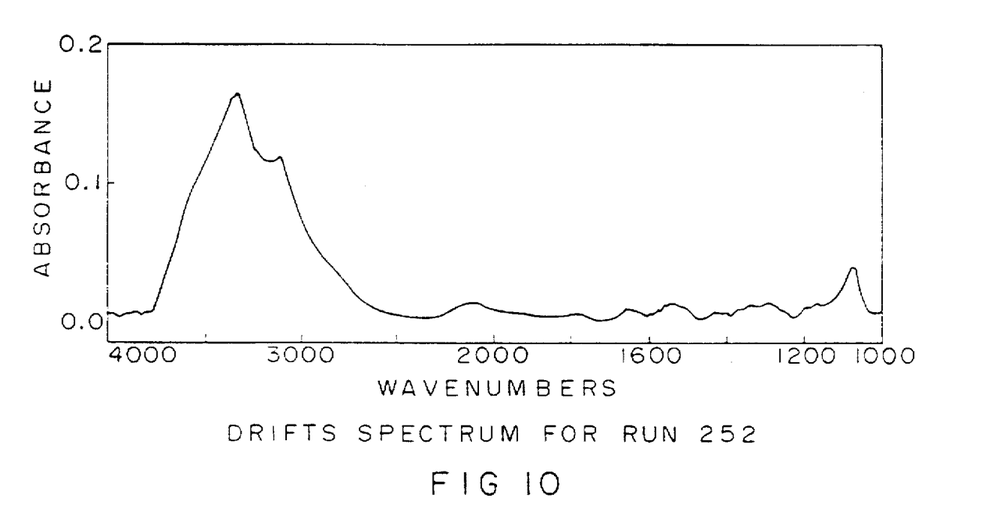

A DRIFT spectrum of boehmite is shown in FIG. 6.

FIGS. 7–10 show graphical depictions comparing Fourier Transform Infrared Analysis of various modified grind aluminas.

It is important to note that DRIFT analyses are outermost surface sensitive to bonding chemistry, as shown in FIGS. 2–10. The importance of using DRIFT analyses to interrogate aluminas may be exemplified by showing the similarities of Run 195 and Run 196 when compared by conventional means. Zeta potential measures of these two powders were determined and compared graphically. ESCA (surface elemental) measures were taken and analyses of the two powders also were determined and compared. By both measures, these products are essentially indistinguishable. However, the chemical bonding of the surfaces of these products, as interrogated by DRIFT analyses, is identified and determined to be considerably different and to be responsible for the markedly different product performance of the novel product of the present invention. Boehmite also did not show up by classical x-ray diffraction analyses, as would be the result attributable to a very fine layer of the outer phase of the novel product of the present invention, since x-ray diffraction analyses requires at least about 2–5% of the material to be present. These DRIFT analytical efforts unambiguously show that the modified grinding process of the present invention provides for the exclusive formation of boehmite on the surface of calcined alumina, effectively creating a composite system possessing several unique product attributes.

The surface coating process of the present invention also is appropriate to other alumina products and phases, effectively allowing for a various range of products. This product can be depicted as structured in the illustration in FIG. 1 as a core/shell system wherein the bulk phase is the original product (i.e., alpha alumina).

The surface phase, the thickness of which can be controlled by process conditions (i.e., amount of water, grind time) is uniquely boehmite. Since the surface coating occurs in the grinding process, fresh active (high energy) calcined alumina (i.e., alpha, gamma, other) surface is converted immediately to stabilized (low energy) boehmite. The surface conversion phase is constrained to form boehmite by limiting the amount of water present, which thermodynamically drives the surface to the oxyhydroxide (boehmite) as opposed to a trihydrate phase.

The depth of the boehmite phase is on the order of tens of nanometers, e.g., 5–100 nanometers.

The modified grinding process of the present invention has been found to provide several distinct advantages.

The grind time required to achieve desired surface area and particle size has been found to be reduced significantly, since water quickly passivates the newly created surface, minimizing total surface energy as new surface is created.

The end product of the present invention has been found to be a composite material composed of a calcined alumina core with a boehmite surface of controlled thickness.

The passivated (i.e., low energy) surface of the product of the present invention greatly reduces final product reactivity with water, which translates to gelation resistance/reduction and extended shelf life. Changes in product performance with shelf life have long been sought as part of desired performance parameters in respect to reactive calcined aluminas. In situ surface formation of bayerite is the main cause of gelation in non-passivated calcined aluminas. The in situ surface formation of bayerite now will not occur or will be greatly suppressed in the alpha/boehmite composites of the present invention.

EXAMPLE

Aluminum oxide of $\alpha$-$Al_2O_3$, supplied by the Aluminum Company of America, North America Industrial Chemicals Division, was added to two 6 feet×10 feet alumina-lined ball mills. The grinding media was 1 inch diameter 85% $Al_2O_3$ balls. Scalping screens were Sweco 10 mesh screens used to remove any grinding media or chips from the ground powder after discharge from the mills. At least 500 pounds of aluminum oxide of ($\alpha$-$Al_2O_3$ feed material were milled for each run. Water was added based on the dry weight of the powder to the mill before the milling started, beginning with 0.1 wt. %. The aluminum oxide of $\alpha$-$Al_2O_3$ feed material was ground to give the equivalent of the grind of Al$\alpha$A-152SG. Material moisture and temperature were measured and recorded before and immediately after grinding. The mill was run overnight with a flush lot to preheat the mill and to determine the temperatures of the material and the mill. Relative humidity (R. H.) also was measured and recorded each day. Any evidence of chlorine odor was recorded during milling or upon opening of the mill or discharging. The ground milled powders were stored in plastic lined fiber drums with sealed liners. Results are shown in Table I.

Grinding the specified α-Al$_2$O$_3$ in accordance with the present invention in the small production scale ball mill of the Example and 1300–1500 pounds of powder in a ball-to-charge ratio of 10:1 combined with an elevated temperature of the mill and charge of about 190° to 210° F. caused the powder surface to convert to boehmite as indicated by DRIFT analysis and to produce micro-composite particles of α-Al$_2$O$_3$ cores and boehmite surfaces.

The micro-composite particles of α-Al$_2$O$_3$ cores and boehmite surfaces were found to be gel resistant after 72 hours or more of setting and became stable in two days or less.

It was found further that the surface area increased by 40% over the dry ground product.

Grinding efficiency improved with water addition at normal grinding conditions.

As shown in Table I for Runs 195, 196, 221, 222, 235, 236, 251, and 252, the particle size distribution got finer, the green density went up at 5000 psi pressing pressures, the firing densities went up, and the shrinkage went down. Accordingly, it was learned empirically thereby to provide, preferably, 0.75% moisture added and 5 hours grinding (instead of 0% at 8 hours) of the Alcoa A-152SG Super Ground product designation of α-Al$_2$O$_3$ reactive alumina.

It has been found that similar results were achieved in the Alcoa A-17 product designation of α-Al$_2$O$_3$ reactive alumina.

higher surface areas (3.2 vs. 4.3–5.0 m$^2$/g). The novel dual phase particles of the present invention have tighter green and fired densities and shrinkage specifications than the Alcoa A-152SG Super Ground Reactive Alumina.

The stability of the increased surface area of the controlled water addition ground A-152GR material was checked at different temperatures. Surface area was used to monitor the destruction of this layer after heating the material for 30 minutes at temperatures in the range of 250° to 600° C. The results are presented in Table II as follows.

TABLE II

Surface Area Stability/Temperatures

| Temperature (°C.) | Surface Area (m$^2$/g) |
|---|---|
| 250 | 4.3 |
| 300 | 4.4 |
| 400 | 4.5 |
| 500 | 4.6 |
| 600 | 4.4 |

Drift analyses were performed on these samples and showed the boehmite to be present up to about 450° C. The high surface area retained up to 600° C. shows a microporosity exists in the boehmite layer that is retained after the boehmite layer decomposes. However, this high thermal stability of the boehmite layer shows that it will not degrade during normal mixing and slurry processing of the material.

TABLE I

Physical And Ceramic Properties Of Experimental Grinds

| Run | 195 | 196 | 221 | 222 | 235 | 236 | 251 | 252 |
|---|---|---|---|---|---|---|---|---|
| % H$_2$O | 0 | 1.0 | 0 | 1.0 | 0.5 | 0.1 | 0.5 | 0.75 |
| Grind | 8 hr. | 8 hr. | 8 hr. | 6 hr. | 6 hr. | 8 hr. | 10 hr. | 7 hr. |
| Surf[1] | 3.2 | 5.6 | 2.9 | 4.7 | 3.9 | 3.2 | 4.8 | 5 |
| Part[2] | 3.4 | 3.2 | 3.6 | 3.6 | 3.7 | 3.6 | 3.6 | 3.6 |
| Den[3] | 2.32 | 2.4 | 2.33 | 2.39 | 2.37 | 2.35 | 2.4 | 2.4 |
| Den[4] | 3.84 | 3.88 | 3.77 | 3.82 | 3.81 | 3.82 | 3.84 | 3.83 |
| Gelation Test (centipoise) | | | | | | | | |
| Start | Fluid | Fluid | Fluid | Fluid | Fluid | Fluid | Fluid | Fluid |
| 0 mm | 40 | 1560 | 136 | 256 | 48 | 48 | 48 | 48 |
| 5 mm | 85 | 1520 | 648 | 700 | 64 | 56 | 104 | 170 |
| 10 mm | 208 | 1520 | 686 | 776 | 64 | 56 | 608 | 240 |
| 24 hr | Gel | Soft[5] | Gel | Fluid | Med[5] | Gel | Gel | Fluid |
| 0 mm | | 764 | | 2222 | 600 | | | 520 |
| 5 mm | | 896 | | 2060 | 1190 | | | 792 |
| 10 mm | | 900 | | 1946 | 1460 | | | 848 |
| 48 hr | | Fluid | | Soft[6] | Soft[6] | | | Soft[6] |
| 0 mm | | 2000 | | 696 | 400 | | | 680 |
| 5 mm | | 1800 | | 904 | 692 | | | 760 |
| 10 mm | | 1640 | | 986 | 690 | | | 760 |
| 72 hr | | Fluid | | Fluid | Soft | | | Fluid |
| 0 mm | | 1200 | | 1836 | 2220 | | | 1230 |
| 5 mm | | 1220 | | 1780 | 2880 | | | 1380 |
| 10 mm | | 1260 | | 1740 | 3120 | | | 1380 |

[1]BET Surface Area (m$^2$/g) by Gemini
[2]Particle Size by Sedigraph 5100 (μm)
[3]Green Density (g/cm$^3$)
[4]Fired Density (g/cm$^3$), 1620° C., 1 Hr.
[5]Added 0.1% dispersant
[6]Added 0.05% dispersant
mn = minute(s)
hr = hour(s)

It has been found that the novel dual phase particles of the present invention have certain chemical compositional properties in line with super ground reactive aluminas, e.g., such as Alcoa product designation A-152SG, with the exception of slightly higher SiO$_2$ levels (0.029% vs. 0.047%) and While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A process for producing a gelation-resistant alumina, comprising:
   a. providing an aluminum oxide of $\alpha Al_2O_3$; and
   b. grinding said aluminum oxide of $\alpha Al_2O_3$ in a sealed grinding vessel in the presence of about 0.5 to 3.0 wt. % water and the balance aluminum oxide to form a gelation-resistant alumina.

2. The process as set forth in claim 1 wherein said aluminum oxide of $\alpha$-$Al_2O_3$ comprises aluminum trihydroxide calcined at a temperature of at least about 1000° C.

3. The process as set forth in claim 1, wherein said grinding said aluminum oxide of $\alpha$-$Al_2O_3$ in a sealed grinding vessel in the presence of about 0.5 to 3.0 wt. % water and the balance aluminum oxide to form a gelation resistant alumina comprises grinding in a sealed ball mill.

4. The process as set forth in claim 1 further comprising:
   (c) dispersing said gelation-resistant alumina in an aqueous slurry having a solids content of at least about 50 wt. %, said slurry capable of resisting gelling over an extended shelf life.

5. The process as set forth in claim 1 comprising forming an aluminum oxide hydroxide phase of $\gamma$-AlOOH on said aluminum oxide of $\alpha$-$Al_2O_3$.

6. The process as set forth in claim 1, wherein said grinding said aluminum oxide of $\alpha$-$Al_2O_3$ in a sealed grinding vessel in the presence of about 0.5 to 3.0 wt. % water and the balance aluminum oxide comprises grinding at a temperature in the range of about 80° C. to 220° C.

7. The process as set forth in claim 1, comprising grinding said aluminum oxide of $\alpha$-$Al_2O_3$ in the presence of about 0.65 to 0.85 wt. % water and the balance aluminum oxide.

8. The process as set forth in claim 2 wherein said aluminum oxide of $\alpha$-$Al_2O_3$ comprises aluminum trihydroxide calcined at a temperature of about 1075° to about 1250° C.

9. The process as set forth in claim 4 further comprising:
   (d) using said gelation resistant aqueous alumina slurry in an electronic substrate manufacturing operation.

10. The process as set forth in claim 8, wherein said providing an aluminum oxide of $\alpha$-$Al_2O_3$ comprises providing a fluoride mineralized aluminum oxide of $\alpha$-$Al_2O_3$ and wherein said grinding said aluminum oxide of $\alpha$-$Al_2O_3$ comprises grinding in a sealed ball mill in the presence of about 0.65 to 0.85 wt. % water and the balance aluminum oxide at a temperature in the range of about 80° C. to 100° C.

11. The process as set forth in claim 10 comprising forming dual phase alumina particles having an aluminum oxide hydroxide outer phase of $\gamma$-AlOOH on said aluminum oxide of $\alpha$-$Al_2O_3$, said dual phase alumina particles having between 20 to 40% higher surface area than said aluminum oxide of $\alpha$-$Al_2O_3$.

12. The process as set forth in claim 10 comprising forming dual phase alumina particles having an aluminum oxide hydroxide outer phase of $\gamma$-AlOOH to a nominal depth of about 5 to 100 nanometers on said aluminum oxide of $\alpha$-$Al_2O_3$.

13. A gelation-resistant alumina product comprising ground thermally reactive alumina composed of dual phase alumina particles having an aluminum oxide inner core of $\alpha$-$Al_2O_3$ and an aluminum oxide hydroxide outer phase of $\gamma$-AlOOH on said aluminum oxide inner core of $\alpha$-$Al_2O_3$.

14. The gelation-resistant alumina product as set forth in claim 13, said dual phase alumina particles having an aluminum oxide hydroxide outer phase of $\gamma$-AlOOH to a nominal depth of about 5 to 100 nanometers on said aluminum oxide of $\alpha$-$Al_2O_3$.

15. The gelation-resistant alumina product as set forth in claim 13, said dual phase alumina particles having between 20 to 40% higher surface area than said aluminum oxide of $\alpha$-$Al_2O_3$.

16. The gelation-resistant alumina product as set forth in claim 13, wherein said ground thermally reactive alumina comprises dual phase alumina particles formed by providing aluminum oxide of $\alpha$-$Al_2O_3$ and grinding said aluminum oxide of $\alpha$-$Al_2O_3$ in the presence of about 0.5 to 3.0 weight per cent water and the balance aluminum oxide to form a gelation-resistant alumina.

17. The gelation-resistant alumina product as set forth in claim 16, wherein said grinding said aluminum oxide of $\alpha$-$Al_2O_3$ comprises grinding in a sealed ball mill in the presence of about 0.5 to 1.0 weight per cent water and the balance aluminum oxide at a temperature in the range of about 80° C. to 110° C.

18. A gelation-resistant alumina slurry product, comprising ground thermally reactive alumina in an aqueous slurry having a solids content of at least about 50 weight per cent, said slurry capable of resisting gelling over an extended shelf life, wherein said ground thermally reactive alumina comprises dual phase alumina particles having an aluminum oxide inner core of $\alpha$-$Al_2O_3$ and an aluminum oxide hydroxide outer phase of $\gamma$-AlOOH on said aluminum oxide inner core of $\alpha$-$Al_2O_3$ formed by providing an aluminum oxide of $\alpha Al_2O_3$ and grinding said aluminum oxide of $\alpha$-$Al_2O_3$ in the presence of about 0.5 to 3.0 weight per cent water and the balance aluminum oxide to form a gelation-resistant alumina.

19. The gelation-resistant alumina slurry product as set forth in claim 18, wherein said ground thermally reactive alumina comprises dual phase alumina particles having an aluminum oxide inner core of $\alpha$-$Al_2O_3$ and an aluminum oxide hydroxide outer phase of $\gamma$-AlOOH on said aluminum oxide inner core of $\alpha$-$Al_2O_3$ formed by providing an aluminum oxide of $\alpha$-$Al_2O_3$ and grinding said aluminum oxide of $\alpha$-$Al_2O_3$ in the presence of about 0.5 to 1.0 weight per cent water and the balance aluminum oxide to form a gelation-resistant alumina.

* * * * *